United States Patent
Song et al.

(10) Patent No.: US 8,970,899 B2
(45) Date of Patent: Mar. 3, 2015

(54) SYSTEM FOR ACCEPTING MAIL MATTER, INCLUDING A LABELER ATTACHING A LABEL CONTAINING A REGISTERED BARCODE TO MAIL MATTER

(71) Applicant: Electronics and Telecommunications Research Institute, Daejeon (KR)

(72) Inventors: Jae Gwan Song, Daejeon (KR); Dong Ho Kim, Daejeon (KR); Hyongook Kim, Chungcheongnam-do (KR); Yong Hoon Choi, Daejeon (KR); Hoon Jung, Daejeon (KR); Jong Heung Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/864,357

(22) Filed: Apr. 17, 2013

(65) Prior Publication Data

US 2013/0278947 A1  Oct. 24, 2013

(30) Foreign Application Priority Data

Apr. 19, 2012  (KR) .......................... 10-2012-0041109

(51) Int. Cl.
*G06K 17/00* (2006.01)
*G07B 17/00* (2006.01)

(52) U.S. Cl.
CPC .......... *G06K 17/00* (2013.01); *G07B 17/00193* (2013.01); *G07B 2017/00225* (2013.01); *G07B 2017/0062* (2013.01); *G07B 2017/00701* (2013.01); *G07B 2017/00725* (2013.01)

USPC .......................... 358/1.6; 358/1.15; 705/406

(58) Field of Classification Search
None
See application file for complete search history.

(56) References Cited

U.S. PATENT DOCUMENTS

2007/0181662 A1 *  8/2007  Satherblom et al. ............ 232/45
2011/0035337 A1 *  2/2011  Choi et al. .................... 705/406
2011/0093117 A1 *  4/2011  Rundle et al. ................. 700/219

FOREIGN PATENT DOCUMENTS

| KR | 10-2003-0004975 A | 1/2003 |
| KR | 10-2006-0024553 A | 3/2006 |
| KR | 10-2007-0009204 A | 1/2007 |
| KR | 10-2011-0015995 A | 2/2011 |

* cited by examiner

*Primary Examiner* — Steven Kau
*Assistant Examiner* — Andrew H Lam
(74) *Attorney, Agent, or Firm* — Rabin & Berdo, P.C.

(57) ABSTRACT

A system for accepting a mail matter is provided, which includes an image processing unit recognizing a mailing address; a weight measurement unit measuring a weight of the mail matter; a mailing address information input unit; a postage information storage unit; a postage settlement unit; an interface unit for selecting mailing addresses of an addresser and an addressee; a labeler printing the mailing addresses of the addresser and the addressee and a registered barcode on a label and attaching the label to the mail matter; a discharger discharging the mail matter; and an integrated control unit settling the postage through the postage settlement unit, attaching the selected mailing addresses of the addresser and the addressee and the registered barcode to the mail matter through the labeler, and discharging the mail matter through the discharger.

5 Claims, 6 Drawing Sheets

SYSTEM FOR ACCEPTING MAIL MATTER, INCLUDING A LABELER ATTACHING A LABEL CONTAINING A REGISTERED BARCODE TO MAIL MATTER

CROSS-REFERENCES TO RELATED APPLICATIONS

The present application claims priority under 35 U.S.C. 119(a) to Korean Application No. 10-2012-0041109, filed on Apr. 19, 2012, in the Korean Intellectual Property Office, which is incorporated herein by reference in its entirety set forth in full.

BACKGROUND

Exemplary embodiments of the present invention relate to a system for accepting a mail matter, and more particularly, to a system for accepting a mail matter, which enables a client to directly accept the mail matter.

In general, a client who intends to send mail matters accepts the mail matters through a window of a post office. If a client submits mail matters to a window clerk, the window clerk performs a mail matter acceptance service, such as confirmation of a standard and the state of mail matters, measurement of weights of mail matters and calculation of postage, reception of postage, and issuance of receipt, outputs registered barcode labels as many as the number of mail matters and attaches the labels to the accepted mail matters, and then inputs addresser information and addressee information to a mail matter information management server. In this case, the input information is utilized as information for automatically classifying the mail matters by districts in a mail center and various kinds of statistical information.

The post-office service for accepting mail matters is performed only in working hours, and at specific times, clients who intend to accept mail matters may wait for a long time.

If there are many clients who intend to accept mail matters through a window, the corresponding window clerk may bear increased workload, and thus may be unable to input acceptance information to cause the corresponding mail matters not to be automatically classified by an automatic classifier.

Due to this, it take a lot of time to input acceptance information, such as acceptance information of addressers and addressees, for record management and tracking of the mail matters, and this causes the increase of the waiting time of the clients and the work load of the clerk at the window.

The background technology of the present invention is disclosed in Korean Unexamined Patent Publication No. 10-2006-0024553 (published on Mar. 17, 2006).

SUMMARY

An embodiment of the present invention relates to a system for accepting a mail matter, which can automatically perform a series of processes of accepting a mail matter and thus improve the efficiency of a mail matter acceptance service.

In one embodiment, a system for accepting a mail matter includes: an image processing unit recognizing a mailing address mentioned on the mail matter through photographing of the mail matter; a weight measurement unit measuring a weight of the mail matter; a mailing address information input unit receiving an input of the mailing address from an external storage device; a postage information storage unit storing postage information; a postage settlement unit settling the postage in association with a financial server; an interface unit displaying the mailing address input from the mailing address information input unit and the mailing address recognized by the image processing unit to make it possible to select mailing addresses of an addresser and an addressee from the mailing address input from the mailing address information input unit; a labeler printing the mailing addresses of the addresser and the addressee and a registered barcode on a label and attaching the label to the mail matter; a discharger discharging the mail matter to which the label is attached through the labeler; and an integrated control unit settling the postage through the postage settlement unit by reading the postage information stored in the postage information storage unit in accordance with the weight measured by the weight measurement unit, attaching the mailing addresses of the addresser and the addressee and the registered barcode selected by the interface unit to the mail matter through the labeler, and discharging the mail matter through the discharger.

The mailing addresses of the addresser and the addressee may be input by keys through the interface unit.

The system for accepting a mail matter according to one embodiment may further include an erroneous mail matter discharge unit discharging the mail matter if the mailing address is not recognized through the image processing unit.

The labeler may include a label leading unit leading the label; a label transport unit transporting the label that is led by the label leading unit; a label printer printing the mailing addresses of the addresser and the addressee and the registered barcode on the label that is transported by the label transport unit; an attached surface forming unit spreading adhesives on a bottom surface of the label on which the mailing addresses of the addresser and the addressee and the registered barcode are printed through the label printer; a label pressing unit pressingly attaching the label on which the adhesives are spread to the mail matter; and a labeler control unit controlling the label leading unit to input the label to the label transport unit, the label transport unit to transport the label, the label printer to print the mailing addresses of the addresser and the addressee and the registered barcode on the label, the an attached surface forming unit to spread the adhesives on the label, and the label pressing unit to pressingly attach the label on the mail matter.

The label leading unit may include a label custody barrel accumulatively loading labels by sheets; a label guide unit guiding transporting of the labels loaded in the label custody barrel to the label transport unit; a label roller compulsorily transporting the labels sheet by sheet through the label guide unit; and a label roller driving unit driving the label roller.

The loader may include a discharge unit discharging mail matters to which the labels are attached through the labeler; a loading box for loading the mail matters discharged from the discharger; a mail matter sensing unit sensing a quantity of the mail matters loaded in the loading box; a loading box sensing unit sensing a position of the loading box; a loading box transport unit transporting the loading box; and a loader control unit replacing the loading box through the loading box transport unit in accordance with the quantity of the mail matters sensed by the mail matter sensing unit and the position of the loading box sensed by the loading box sensing unit.

The mail matter sensing unit may sense a height of the mail matters loaded in the loading box.

The mail matter sensing unit may sense the weight of the mail matters loaded in the loading box.

The system for accepting a mail matter according to one embodiment may further include a receipt printer printing a receipt for the postage and the result of accepting the mail matter.

According to the present invention, the client can directly accept the mail matters in a public place or in a post office, and thus the efficiency of the mail service can be improved.

Further, according to the present invention, since the waiting time of the clients who wait for the acceptance of mail matters at the window of the post office can be reduced and the clients can easily accept the mail matters even in non-working hours of the post office, the clients can conveniently accept the mail matters at desired time.

Further, according to the present invention, since the work load of the clerk of the post office for acceptance of clients' mails can be reduced, the lost opportunity cost is minimized, and the cost of mail acceptance is reduced.

Further according to the present invention, since sheets of label are used with no strip of paper, waste of labels is prevented, and the equipment maintenance cost is saved. Further, due to the convenience that the clients can directly accept the mail matters, the present invention can be utilized as core equipment for constructing an unmanned mail corner for non-standard mail matters or parcel post in due time.

Further, according to the present invention, since the loading boxes that are fully loaded with the mail matters can be automatically replaced, the time and cost required for collection of the mail matters can be reduced.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Figure 1:
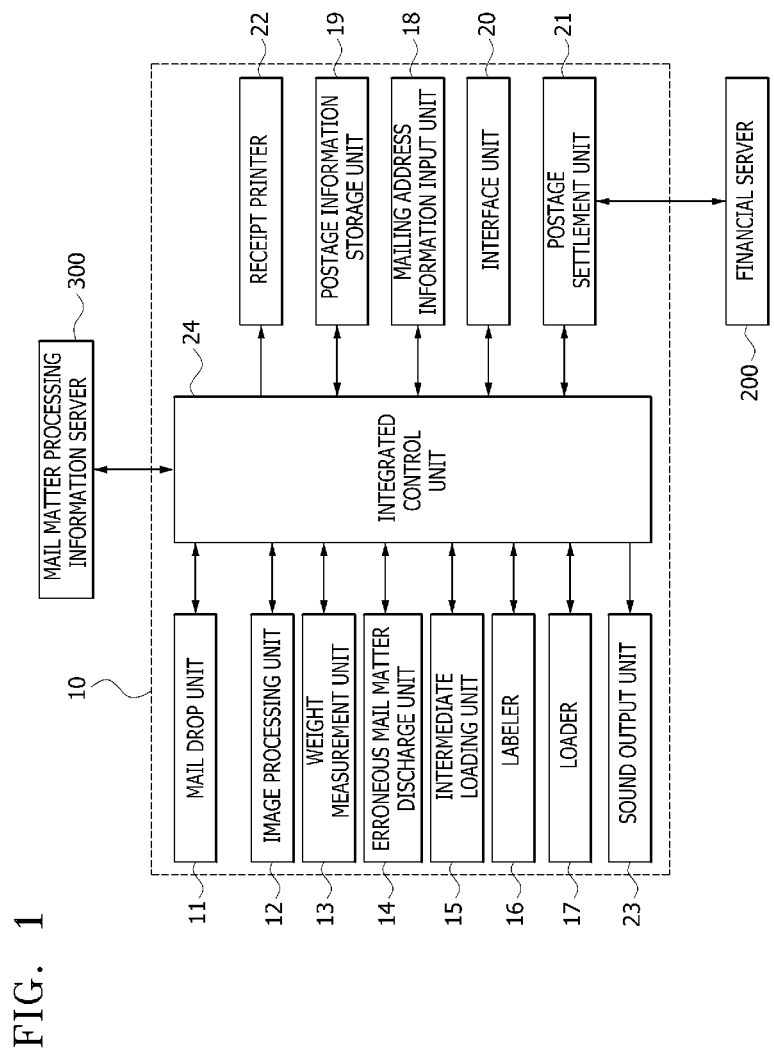
FIG. 1 illustrates a block diagram of a system for accepting a mail matter according to an embodiment of the present invention.

Hereinafter, a system for accepting a mail matter according to an embodiment of the present invention will be described in detail with reference to accompanying drawings. In the drawings, line thicknesses or sizes of elements may be exaggerated for clarity and convenience. Also, the following terms are defined considering function of the present invention, and may be differently defined according to intention of an operator or custom. Therefore, the terms should be defined based on overall contents of the specification.

Figure 2:
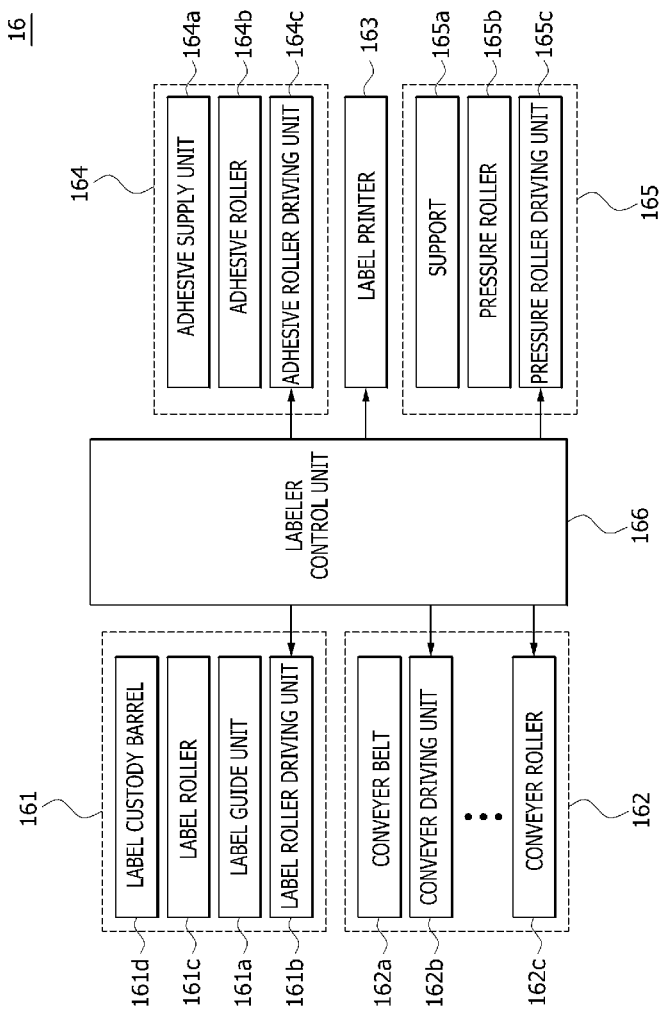
FIG. 2 illustrates a block diagram of a labeler in FIG. 1.
Figure 3:
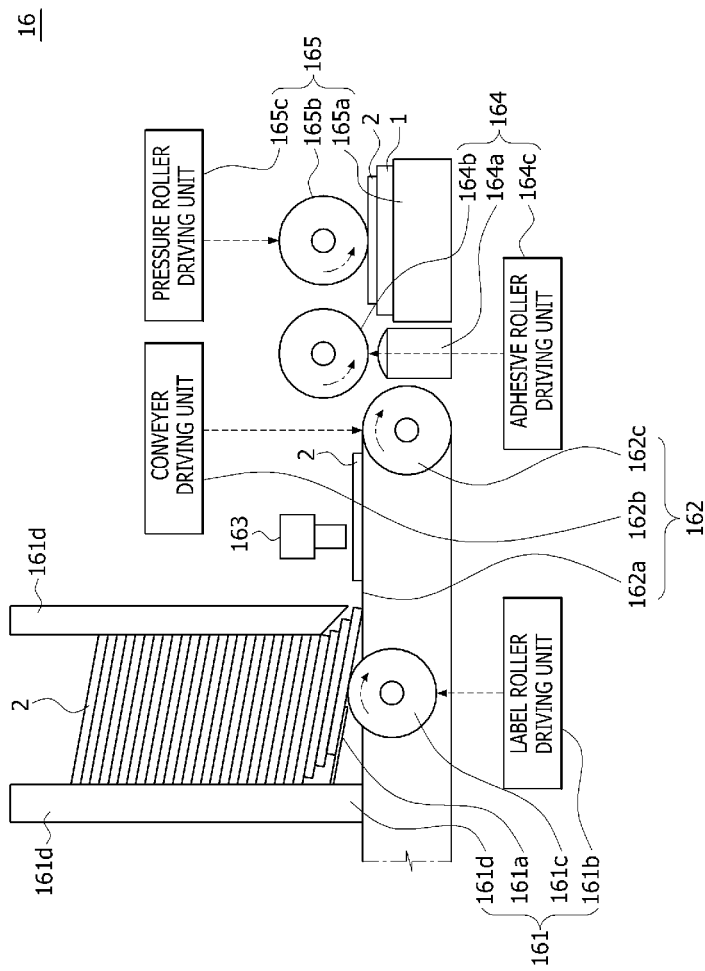
FIG. 3 illustrates a schematic view of a labeler in FIG. 1.
Figure 4:
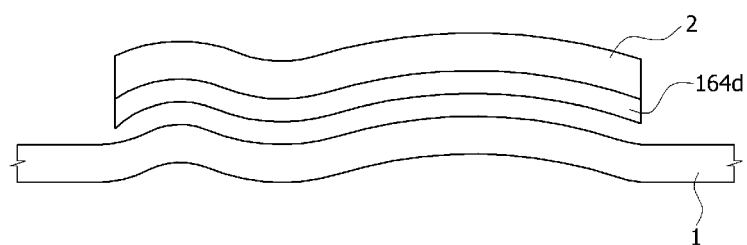
FIG. 4 illustrates a view of an example of a label attached by a labeler in FIG. 1.
Figure 5:
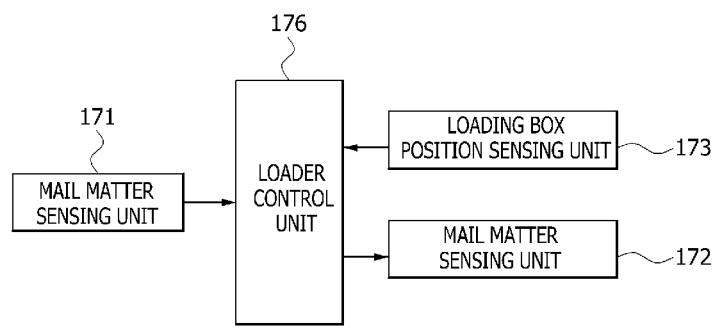
FIG. 5 illustrates a block diagram of a loader in FIG. 1.
Figure 6:
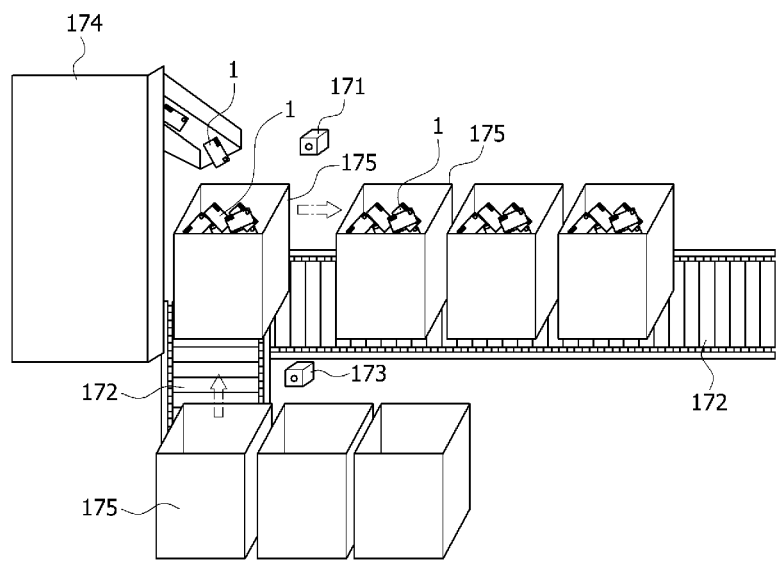
FIG. 6 illustrates a schematic view of a loader in FIG. 1.

FIG. 1 illustrates a block diagram of a system for accepting a mail matter according to an embodiment of the present invention. FIG. 2 illustrates a block diagram of a labeler in FIG. 1, and FIG. 3 illustrates a schematic view of a labeler in FIG. 1. FIG. 4 illustrates a view of an example of a label attached by a labeler in FIG. 1. FIG. 5 illustrates a block diagram of a loader in FIG. 1, and FIG. 6 is a schematic view of a loader in FIG. 1.

As illustrated in FIG. 1, a system 10 for accepting a mail matter according to an embodiment of the present invention settles a postage, which is calculated with respect to a mail matter 1 in order to accept the mail matter 1, through a financial server 200, and stores information that is created in a process of accepting the mail matter in a mail matter processing information server 300.

The system 10 for accepting a mail matter includes a mail drop unit 11, an image processing unit 12, a weight measurement unit 13, an erroneous mail matter discharge unit 14, an intermediate loading unit 15, a labeler 16, a loader 17, a mailing address information input unit 18, a postage information storage unit 19, an interface unit 20, a postage settlement unit 21, a receipt printer, a sound output unit 23, and an integrated control unit 24.

First, the mail drop unit 11 enables the mail matter 1 that a client intends to send to be transported to an inside of a case (not illustrated) and to be dropped to the image processing unit 12, and may adopt various methods for sensing and automatically transporting the mail matter 1.

The image processing unit 12 acquires and stores an image through photographing of the mail matter 1 dropped by the mail drop unit 11, and recognizes characters mentioned on the mail matter, i.e., mailing addresses of an addresser and an addressee, from the acquired image. The image processing unit 12 may adopt a line-scan camera or the like.

The weight measurement unit 13 measures the weight of the mail matter 1.

Here, the recognition of the mailing addresses of the addresser and the addressee recorded on the mail matter 1 through the image processing unit 12 and the measurement of the weight of the mail matter 1 through the weight measurement unit 13 may be simultaneously performed or may be sequentially performed.

The erroneous mail matter discharge unit 14 discharges an erroneous mail matter 1, of which the mailing addresses of the addresser and the addressee are not normally recognized by the image processing unit 12, to an outside.

The intermediate loading unit 15 temporarily loads and takes custody of the mail matter 1 to calculate and settle the postage of the mail matter 1 of which the mailing addresses of the addresser and the addressee are normally recognized by the image processing unit 12 and of which the weight is normally measured by the weight measurement unit 13.

The labeler 16 prints a registered barcode and the mailing addresses of the addresser and the addressee recognized by the image processing unit 12 on a label 2, and attaches the label 2 to the mail matter 1.

The labeler 16 will be described in detail with reference to FIGS. 2 to 4.

Referring to FIGS. 2 to 4, the labeler 16 includes a label leading unit 161 leading the label 2, a label transport unit 162 transporting the label 2 that is led by the label leading unit 161, a label printer 163 printing the registered barcode and the mailing addresses of the addresser and the addressee on the label 2 that is transported by the label transport unit 161, an adhesive surface forming unit 164 forming an adhesive surface by spreading adhesives 164d on a bottom surface of the label 2 which is printed by the label printer 163 and is transported by the label transport unit 162, a label pressing unit 165 pressingly attaching the label 2 on which the adhesives 164d are spread to the mail matter 1, and a labeler control unit 166 controlling the labeler 16 as a whole.

The label leading unit 161 includes a label custody barrel 161d taking custody of the label 2 by sheets, a label guide unit 161a guiding transportation of the label 2 loaded in the label custody barrel 161d to the label transport unit 162, a label roller 161c compulsorily transporting the label 2 sheet by sheet through the label guide unit 161a, and a label roller driving unit 161b driving the label roller 161c.

The label custody barrel 161d may be variously formed depending on the size and shape of the label 2. The label custody barrel 161d has an open lower portion, and loads the labels 2 by sheets in a vertical direction to ground. Since the sheets of label 2 do not require a strip of paper, waste of the labels is prevented, and the maintenance cost is saved.

The label guide unit 161a is installed to be inclined to the ground so that a lower portion of the label custody barrel 161d is open toward a conveyer belt 162a of the label transport unit 162, and guides the label 2 which slides through the open portion of the label custody barrel 161d and is transported to the conveyer belt 162a of the label transport unit 162.

The label roller 161c is installed on the lower portion of the label custody barrel 161d to come in contact with the label 2 through the open portion by the label guide unit 161a, and is rotated in accordance with a control signal of a label roller driving unit 161a. As the label roller 161c is rotated, the label 2 that comes in contact with the label roller 161c is transported to the conveyer belt 162a by a frictional force of the label roller 161c.

A label roller driving unit 161b drives the label roller 161c.

The label transport unit 162 includes the conveyer belt 162a that transports the label 2 led by the label leading unit 161, a conveyer roller 162c that travels the conveyer belt 162a, and a conveyer driving unit 162b that drives the conveyer roller 162c.

The label printer 163 prints the registered barcode and the mailing addresses of the addresser and the addressee recognized by the image processing unit 12 on the label 2 that is transported by the label transport unit 162.

The adhesive surface forming unit 164 includes an adhesive supply unit 164a installed to be spaced apart from the conveyer belt 162a to supply the adhesives 164d to a bottom surface of the label 2 transported by the conveyer belt 162a, an adhesive roller 164b installed on an upper side of the adhesive supply unit 164a to be spaced apart from the adhesive supply unit 164a to pressingly transport the label 2 so that the adhesives 164d are spread on the label 2, and an adhesive roller driving unit 164c that drives the adhesive roller 164b.

The label pressing unit 165 includes a support 165a supporting the label 2 on which the adhesives 164d are spread by the adhesive surface forming unit 164 and the mail matter 1, a pressure roller 165b rotated to press the label 2 put on the mail matter 1, and a pressure roller driving unit 165c that drives the pressure roller 165b. In this case, since the mail matter 1 is made of a paper material, it may be crumpled when it is pressed by the pressure roller 165b. However, as illustrated in FIG. 4, since the pressure roller 165b presses the mail matter 1 while it is rotated, the label 2 can be adhered to the mail matter 1 without being crumpled.

The labeler control unit 166 controls the labeler 16 as a whole. The label roller 161c is rotated by the label roller driving unit 161b to lead the labels 2 loaded in the label custody barrel 161d to the conveyer belt 162a sheet by sheet, and the conveyer roller 162c is driven by the conveyer driving unit 161b to transport the label 2 through the conveyer belt 162a.

In this case, the registered barcode input from the integrated control unit 24 and the mailing addresses of the addresser and the addressee recognized by the image processing unit 12 are printed on the label 2 through the label printer 163.

Further, the adhesive roller 164b is driven by the adhesive roller driving unit 164c to spread the adhesives 164d on the bottom surface of the label 2, and then the pressure roller 165b is driven by the pressure roller driving unit 165c to press the label 2 and the mail matter 1 to attach the label 2 to the mail matter 1.

Next, the loader 17 finally loads the mail matter 1 in a loading box 175. As illustrated in FIGS. 5 and 6, the loader 17 includes a mail matter sensing unit 171, a loading box transport unit 172, a loading box position sensing unit 173, and a loader control unit 176.

The discharge unit 174 discharges the mail matter 1 to which the label 2 is attached through the labeler 16 to the loading box 175.

The loading box 175 has an open upper side, and loads mail matters 1 dropped from the discharge unit 174. A plurality of loading boxes are provided and replaced depending on the quantity of mail matters 1 loaded therein.

The loading box transport unit 172 transports the loading box 175 through a predetermined path. Through the loading box transport unit 172, the mail matter 1 discharged from the discharge unit 174 is loaded in the loading box 175, and the loading box 175 is replaced depending on the quantity of mail matters 1.

The loading box position sensing unit 173 senses the position of the loading box 175 that is transported by the loading box transport unit 172. The loading box position sensing unit 173 may adopt various sensors for sensing the position of the loading box 175, such as an infrared sensor and a laser sensor.

The mail matter sensing unit 171 senses the quantity of mail matters 1 loaded in the loading box 175. The mail matter sensing unit 171 senses whether the height of the mail matters 1 loaded in the loading box 175 is higher than an upper end of the loading box 175 or the weight of the loading box 175 to sense the quantity of mail matters 1. That is, the mail matter sensing unit 171 senses the quantity of the mail matters 1 loaded in the loading box 175 through the height or the weight of the mail matters 1 loaded in the loading box 175.

The loader control unit 176 controls the loading box transport unit 172 to transport the loading box 175. If the position of the loading box 175 is sensed by the loading box position sensing unit 173, the loader control unit 176 controls the loading box transport unit 172 to stop the loading box 175. In this case, the loading box 175 is arranged on the side of a discharge port (not illustrated) of the discharge unit 174 that discharges the mail matters 1.

Accordingly, the discharge unit 174 discharges the mail matters 1, and the discharged mail matters 1 are loaded in the loading box 175. In this case, the mail matter sensing unit 171 senses the quantity of the mail matters 1 loaded in the loading box 175. If the quantity of the mail matters 1 is equal to or larger than a predetermined quantity, the loader control unit 176 controls the loading box transport unit 172 to transport the loading box 175 in which the mail matters 1 are loaded, and arranges a new loading box 175 to replace the loaded loading box 175 by the new loading box 175.

That is, if the quantity of the mail matters 1 becomes large, the loader 17 automatically replaces the loading box 175 to solve inconvenience to replace the loading box 175 one by one.

In this case, it is also possible to display the loading state of the mail matters 1, such as to output warning sound or to switch a warning lamp on and off, so that a manager can collect the mail matters 1.

The mailing address information input unit 18 enables a client to input client's mail matter reception information, for example, mailing address information of an addresser and an addressee. The mailing address information input unit 18 may adopt a USB (Universal Serial Bus) port, or the like.

The postage information storage unit 19 stores information for calculating the postage of the accepted mail matter 1. The information for calculating the postage of the mail matter 1 is variously determined depending on the weight of the mail matter 1, or the like.

The interface unit 20 makes it possible to input and display various kinds of information for acceptance of the mail matter 1. The interface unit 20 may adopt a display device and a key input device, or a touch type display device. For example, the interface unit 20 may display the mailing addresses of the addresser and the addressee, which are recognized by the image processing unit 12, and mailing addresses stored in the mailing address information input unit 18 to enable a client to select accurate mailing addresses, or may display the current processing state to enable a client to recognize the current mail matter reception state. In this case, the recognition results of the mailing addresses are displayed in the order of their recognition rates.

The postage settlement unit 21 is connected to the financial server 200 through an external network (not illustrated) to settle the postage according to the mail matter acceptance.

The receipt printer 22 prints the receipt according to the settlement of the postage and the acceptance result.

The sound output unit 23 outputs various kinds of warning sounds according to the mail matter acceptance, or guides the mail matter acceptance process by voice.

The integrated control unit 24 controls the whole operation of the system 10 for accepting a mail matter. The operation of the system 10 for accepting a mail matter will be described in detail with reference to FIG. 7.

Figure 7:
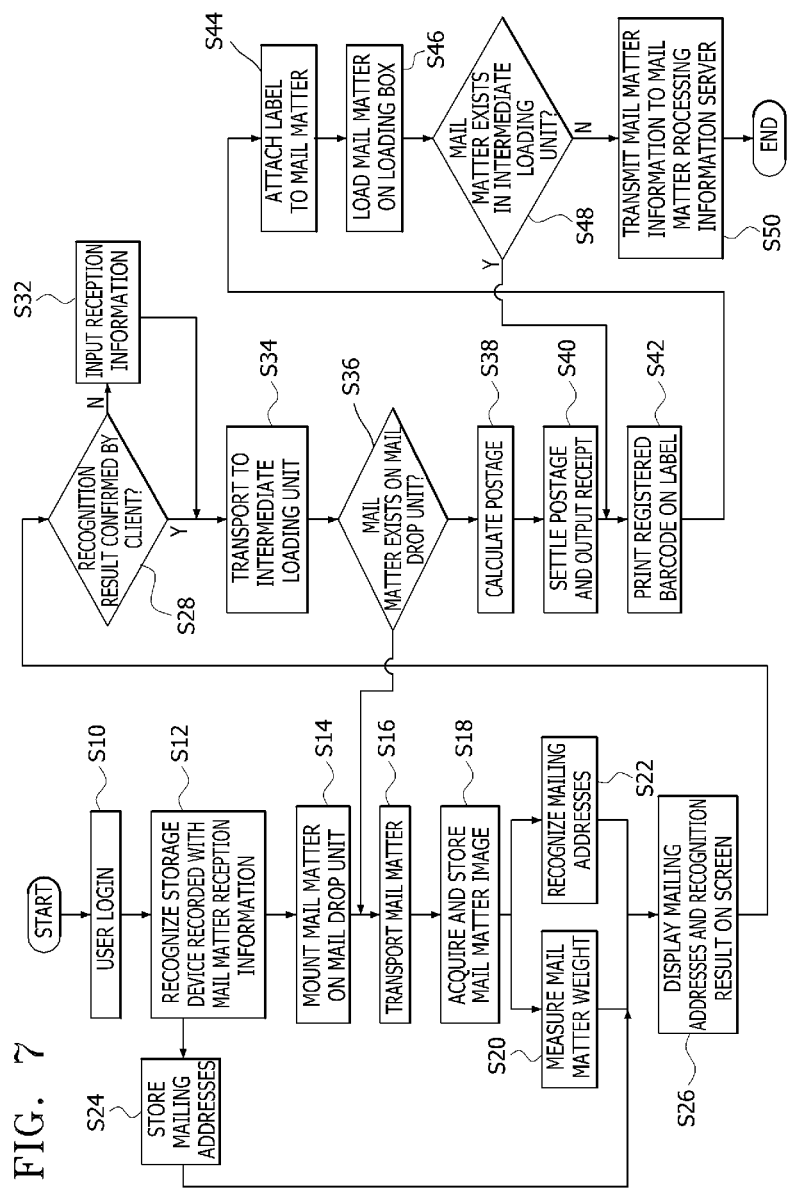
FIG. 7 illustrates a flowchart of an operation of a system for accepting a mail matter according to an embodiment of the present invention.

FIG. 7 illustrates a flowchart of an operation of the system 10 for accepting a mail matter according to an embodiment of the present invention.

If client's personal information is input through the interface unit 20, the integrated control unit 24 performs user login through confirmation of client's service subscription (S10). If the client is not a member of the service, non-member login is performed.

Thereafter, the integrated control unit 24 confirms whether a storage device, in which mail matter reception information, such as mailing addresses of an addresser and an addressee, is recorded, is connected to the mailing address information input unit 18. If the storage device is connected (S12), the integrated control unit 24 recognizes the storage device, and stores the mailing addresses of the addresser and the addressee recorded in the storage device (S24).

Further, if the mail matter 1 is mounted on the mail drop unit 11 (S14) and a command to transport the mail matter 1 is input using a UI (User Interface) menu of the interface unit 20, the integrated control unit 24 controls the mail drop unit 11 to transport the mail matter 1 (S16).

The image processing unit 12 acquires and stores an image through photographing of the mail matter 1 dropped through the mail drop unit 11 (S18), and the weight measurement unit 122 temporarily stops the mail matter 1 and measures the weight of the mail matter 1 (S20). At the same time, the image processing unit 12 recognizes the mailing addresses by sequentially calling pre-stored images of the mail matter 1 (S22).

As described above, if the weight of the mail matter 1 is measured and the mailing addresses of the addresser and the addressee are recognized, the integrated control unit 24 displays the mailing addresses input through the mailing address information input unit 18 and a recognition result candidate list recognized by the image processing unit 12, i.e., the recognized mailing addresses, through the interface unit 20 (S26).

Accordingly, the client can confirm if the mailing addresses input through the mailing address information input unit 18 and the candidate list recognized by the image processing unit 12 are accurate, and the integrated control unit 24 confirms if any one in the candidate list is selected through the interface unit 20 and selects the corresponding mailing addresses (S28).

By contrast, if the accurate mailing addresses are not in the candidate list, the client may directly input the corresponding mailing addresses through the interface unit 20. Accordingly, the interface unit 20 confirms if the mailing addresses are directly input, and if so, finally selects the corresponding mailing addresses (S32).

However, if the mailing addresses input through the interface unit 20 are not normal mailing addresses, it is also possible to discharge such erroneous mail matter through the erroneous mail matter discharge unit 14.

As described above, if the mailing addresses are selected, the integrated control unit 24 transports the corresponding mail matter 1 to the intermediate loading unit 174 (S34).

In this case, the integrated control unit 24 confirms if any additional mail matter 1 exists on the mail drop unit 11 (36), and if so, repeatedly performs the above-described processes (S16 to S34). Further, the integrated control unit 24 reads the postage information on the collected mail matter 1 from the postage information storage unit 19 and selects the postage (S38).

In this case, the postage may be collectively imposed to a client who intends to send a plurality of mail matters 1.

If the postage is calculated, the postage is settled through the postage settlement unit 21, and the receipt and the acceptance result are printed through the receipt printer 22 (S40).

Thereafter, in accordance with the control signal of the integrated control unit 24, the labeler 16 prints information on the mail matter 1 that stands by in the intermediate loading unit 15, i.e., the mailing addresses of the addresser and the addressee and the registered barcode, on the label 2 (S42), and then attaches the label 2 to the surface of the mail matter 1 (S44).

The mail matter 1 as processed above is sequentially loaded on the loader 17 (S46). Here, the loader 17 appropriately distributes a large quantity of mail matters 1 to the respective loading boxes 175 through replacement of the loading boxes 175 depending on the quantities of mail matters 1 loaded in the loading boxes 175.

On the other hand, the control unit confirms if any further mail matters 1 exist in the intermediate loading unit 15, and if so, repeats the above-described processes (S38 to S44).

The integrated control unit 24 transmits the information created in the above-described process of accepting the mail matter to the mail matter processing information server 300 (S50).

In addition, the integrated control unit 24 may guide by voice the process of accepting the mail matter through the sound output unit 23, or may display the process of accepting the mail matter on the screen through the interface unit 20 to enable the client to recognize the process of accepting the mail matter more easily.

The embodiment of the present invention has been disclosed above for illustrative purposes. Those skilled in the art will appreciate that various modifications, additions and substitutions are possible, without departing from the scope and spirit of the invention as disclosed in the accompanying claims.

What is claimed is:

1. A system for accepting a mail matter comprising:
an image processing unit recognizing a mailing address mentioned on the mail matter through photographing of the mail matter;
a weight measurement unit measuring a weight of the mail matter;
a mailing address information input unit receiving an input of the mailing address from an external storage device;
a postage information storage unit storing postage information;
a postage settlement unit settling the postage in association with a financial server;
an interface unit displaying the mailing address input from the mailing address information input unit and the mailing address recognized by the image processing unit to make it possible to select mailing addresses of an addresser and an addressee from the mailing address input from the mailing address information input unit;
a labeler printing the mailing addresses of the addresser and the addressee and a registered barcode on a label and attaching the label to the mail matter;
a discharger discharging the mail matter to which the label is attached through the labeler; and
an integrated control unit settling the postage through the postage settlement unit by reading the postage information stored in the postage information storage unit in accordance with the weight measured by the weight measurement unit, attaching the mailing addresses of the addresser and the addressee and the registered barcode selected by the interface unit to the mail matter through the labeler, and discharging the mail matter through the discharger,
wherein the labeler comprises:
a label leading unit leading the label;
a label transport unit transporting the label that is led by the label leading unit;
a label printer printing the mailing addresses of the addresser and the addressee and the registered barcode on the label that is transported by the label transport unit;
an attached surface forming unit spreading adhesives on a bottom surface of the label on which the mailing addresses of the addresser and the addressee and the registered barcode are printed through the label printer;
a label pressing unit pressingly attaching the label on which the adhesives are spread to the mail matter; and
a labeler control unit controlling the label leading unit to input the label to the label transport unit, the label transport unit to transport the label, the label printer to print the mailing addresses of the addresser and the addressee and the registered barcode on the label, the an attached surface forming unit to spread the adhesives on the label, and the label pressing unit to pressingly attach the label on the mail matter.

2. The system for accepting a mail matter of claim 1, wherein the label leading unit comprises:
a label custody barrel accumulatively loading labels by sheets;
a label guide unit guiding transporting of the labels loaded in the label custody barrel to the label transport unit;
a label roller compulsorily transporting the labels sheet by sheet through the label guide unit; and
a label roller driving unit driving the label roller.

3. A system for accepting a mail matter comprising:
an image processing unit recognizing a mailing address mentioned on the mail matter through photographing of the mail matter;
a weight measurement unit measuring a weight of the mail matter;
a mailing address information input unit receiving an input of the mailing address from an external storage device;
a postage information storage unit storing postage information;
a postage settlement unit settling the postage in association with a financial server;
an interface unit displaying the mailing address input from the mailing address information input unit and the mailing address recognized by the image processing unit to make it possible to select mailing addresses of an addresser and an addressee from the mailing address input from the mailing address information input unit;
a labeler printing the mailing addresses of the addresser and the addressee and a registered barcode on a label and attaching the label to the mail matter;
a loader including a discharger discharging the mail matter to which the label is attached through the labeler; and
an integrated control unit settling the postage through the postage settlement unit by reading the postage information stored in the postage information storage unit in accordance with the weight measured by the weight measurement unit, attaching the mailing addresses of the addresser and the addressee and the registered barcode selected by the interface unit to the mail matter through the labeler, and discharging the mail matter through the discharger,
wherein the mail matter includes a plurality of mail matters and the loader further comprises:
a loading box for loading the mail matters discharged from the discharger;
a mail matter sensing unit sensing a quantity of the mail matters loaded in the loading box;
a loading box sensing unit sensing a position of the loading box;
a loading box transport unit transporting the loading box; and
a loader control unit replacing the loading box through the loading box transport unit in accordance with the quantity of the mail matter sensed by the mail matter sensing unit and the position of the loading box sensed by the loading box sensing unit.

4. The system for accepting a mail matter of claim 3, wherein the mail matter sensing unit senses a height of the mail matters loaded in the loading box.

5. The system for accepting a mail matter of claim 3, wherein the mail matter sensing unit senses the weight of the mail matters loaded in the loading box.

* * * * *